United States Patent
Lee et al.

(10) Patent No.: US 11,001,274 B2
(45) Date of Patent: May 11, 2021

(54) APPARATUS AND METHOD FOR AUTOMATICALLY CONTROLLING DRIVING ASSIST FUNCTION OF VEHICLE

(71) Applicants: HYUNDAI MOTOR COMPANY, Seoul (KR); KIA MOTORS CORPORATION, Seoul (KR)

(72) Inventors: Dong Gu Lee, Seoul (KR); Kyoung Jun Lee, Seoul (KR); Doo Jin Um, Seoul (KR); Dong Eon Oh, Seoul (KR); Hyun Jae Yoo, Seoul (KR); Beom Jun Kim, Seoul (KR); Dae Young Kim, Gwangmyeong-si (KR); Young Min Han, Gunpo-si (KR); Seung Geon Moon, Hwaseong-si (KR); Sung Woo Choi, Gwangmyeong-si (KR); Chan Il Park, Chungcheongbuk-do (KR); Sung Yoon Yeo, Seoul (KR); Hoi Won Kim, Gwacheon-si (KR); Min Chul Kang, Uiwang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 261 days.

(21) Appl. No.: 15/993,815

(22) Filed: May 31, 2018

(65) Prior Publication Data
US 2019/0202472 A1 Jul. 4, 2019

(30) Foreign Application Priority Data

Dec. 28, 2017 (KR) .................. 10-2017-0181862

(51) Int. Cl.
*B60W 50/12* (2012.01)
*B60W 30/095* (2012.01)
(Continued)

(52) U.S. Cl.
CPC ............ *B60W 50/12* (2013.01); *B60W 30/09* (2013.01); *B60W 30/0953* (2013.01); *B60W 30/0956* (2013.01); *B60W 30/12* (2013.01); *B60W 30/162* (2013.01); *B60W 30/165* (2013.01); *B60W 50/14* (2013.01);
(Continued)

(58) Field of Classification Search
CPC .. B60W 50/12; B60W 30/09; B60W 30/0953; B60W 30/0956; B60W 30/12; B60W 30/162; B60W 30/165; B60W 50/14
See application file for complete search history.

(56) References Cited

U.S. PATENT DOCUMENTS

2013/0226408 A1* 8/2013 Fung ..................... A61B 5/18
701/41
2017/0235306 A1* 8/2017 Seki ..................... B60W 40/08
701/23

* cited by examiner

*Primary Examiner* — Michael D Lang
(74) *Attorney, Agent, or Firm* — Brinks Gilson & Lione (57) ABSTRACT

An apparatus for automatically controlling a driving assist function of a vehicle includes a sensing device to sense surrounding information and driving information of the vehicle and a state of a driver, a controller to determine whether an automatic activation condition for automatically activating the driving assist function is satisfied, based on the surrounding information and the driving information of the vehicle, which are acquired from the sensing device, and the sensed driver state, and automatically activate the driving assist function when the automatic activation condition is satisfied.

18 Claims, 5 Drawing Sheets

(51) Int. Cl.
  *B60W 30/09*         (2012.01)
  *B60W 30/165*        (2020.01)
  *B60W 30/16*         (2020.01)
  *B60W 50/14*         (2020.01)
  *B60W 30/12*         (2020.01)
  *B60W 50/00*         (2006.01)

(52) U.S. Cl.
  CPC ............... *B60W 2050/0071* (2013.01); *B60W 2050/0073* (2013.01); *B60W 2050/143* (2013.01); *B60W 2520/10* (2013.01); *B60W 2540/26* (2013.01); *B60W 2540/30* (2013.01); *B60W 2552/05* (2020.02)

APPARATUS AND METHOD FOR AUTOMATICALLY CONTROLLING DRIVING ASSIST FUNCTION OF VEHICLE

CROSS-REFERENCE TO RELATED APPLICATION

This application claims priority to and the benefit of Korean Patent Application No. 10-2017-0181862, filed on Dec. 28, 2017, which is incorporated herein by reference in its entirety.

FIELD

The present disclosure relates to an apparatus and a method for automatically controlling a driving assist function of a vehicle and more particularly to an apparatus and a method for automatically controlling a driving assist function of a vehicle.

BACKGROUND

The statements in this section merely provide background information related to the present disclosure and may not constitute prior art.

Recently, studies and researches have been actively performed on advanced driver assist systems (ADAS) which actively provide a driving assist function based on information of a vehicle state, the state of a driver, and a surrounding environment to reduce a driving burden on a driver and to enhance the convenience of the driver.

The ADAS includes a plurality of driving assist functions. More particularly, the driving assist functions may include a blind spot detection (BSD) function for warning an accident risk which may occur in a blind spot, a forward collision assist system (FCA) function for warning an occupant (e.g., a driver) of possible collision with a front vehicle, an advanced emergency breaking system (AEBS) function for automatically decelerating a vehicle depending on the collision possibility with the front vehicle, an advanced smart cruise control (ASCC) for automatically accelerating or decelerating in the relation to the front vehicle, a lane departure warning system (LDWS) for warning an occupant of the deviation from a lane, a lane keeping assist system (LKAS) for preventing the deviation from a current running lane, and a rear-end collision warning system (RCW) for warning an occupant of possible collision with a rear vehicle.

However, the above-described driving assist functions have disadvantages of being activated under limited situations. For example, the activation requires a driver's action (e.g., a driver switches on the function). According to the conventional technology, the driving assist functions for driving safety (e.g., Highway Driving Assist (HAD), Smart Cruise Control (SCC), and lateral driving assist) require a specific input from the driver before operation even under a situation where vehicle collision or lane deviation is about to occur so that such functions are not automatically performed.

We have discovered that the conventional technology does not count whether the driver's state is normal to provide the operation input by the driver.

SUMMARY

An aspect of the present disclosure provides an apparatus and a method for automatically controlling a driving assist function of a vehicle, capable of determining the degree of risk based on the state of a driver so as to automatically perform an appropriate safety driving function and a convenience function when a higher degree of risk is determined. If the degree of risk is low, such functions may be automatically deactivated.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for automatically controlling a driving assist function of a vehicle includes: a sensing device to sense surrounding information and driving information of the vehicle and a state of a driver, and a controller to determine whether an automatic activation condition for automatically activating the driving assist function is satisfied, based on the sensed surrounding information and driving information of the vehicle, which are acquired from the sensing device, and the sensed driver state, and to automatically activate the driving assist function when the automatic activation condition is satisfied.

In addition, the controller determines that the automatic activation condition is satisfied when it is determined that the driver is careless.

In addition, the controller determines that the automatic activation condition is satisfied when a collision risk with a front vehicle is present.

Further, the controller determines that the automatic activation condition is satisfied when a lane deviation risk of the vehicle is present.

In addition, the controller automatically activates the driving assist function of the vehicle, based on a type of a road on which the vehicle is driving, and a speed of the vehicle.

In addition, the controller determines that the automatic activation condition is not satisfied when it is determined that an operation by the driver is present.

In addition, the controller determines that the automatic activation condition is not satisfied when it is determined that the driver is not careless.

Further, the controller determines that the automatic activation condition is not satisfied, when it is determined that the vehicle actively finishes a minimal risk manoeuver (MRM) operation of controlling the driving or when it is determined that a history that the driver forcibly deactivates the driving assist function is present.

Further, the controller automatically deactivates the activated driving assist function, when determining that the vehicle fails to satisfy the automatic activation condition.

In addition, the controller automatically activates the driving assist function of the vehicle, and the driving assist function is performed by at least one of a smart cruise control (SCC) system configured to control a distance between vehicles, an forward collision warning (FAC) system configured to prevent a collision risk, an lane keeping assist (LKA) system or a lane departure warning (LDW) system configured to inhibit or prevent the vehicle from deviating from a lane, a lane change alert (LCA) system configured to inhibit or prevent interference with an adjacent lane, a highway driving assist (HDA) system configured to assist driving on a highway, or a lane following assist (LFA) system configured to assist the driving on a general road.

According to an aspect of the present disclosure, a method for automatically controlling a driving assist function of a vehicle, includes the steps of: sensing, by a sensing device, surrounding information and driving information of the vehicle and a state of a driver, determining, by a controller, whether an automatic activation condition for automatically activating the driving assist function is satisfied, based on the sensed surrounding information and driving information of the vehicle, which are acquired from a sensing device, and the sensed state of the driver, and automatically activating, by the controller, the driving assist function when the automatic activation condition is satisfied.

In addition, the step of determining whether the automatic activation condition is satisfied includes determining that the automatic activation condition is satisfied when it is determined that the driver is careless.

In addition, the step of determining whether the automatic activation condition is satisfied includes determining that the automatic activation condition is satisfied, when it is determined that a collision risk between the vehicle and a front vehicle is present based on the sensed surrounding information and driving information of the vehicle.

Further, the step of determining whether the automatic activation condition is satisfied includes determining that the automatic activation condition is satisfied, when it is determined that a lane deviation risk of the vehicle is present based on the sensed surrounding information and driving information of the vehicle.

In addition, the step of determining whether the automatic activation condition is satisfied includes determining that the automatic activation condition is not satisfied, when it is determined that an operation of the driver is present.

Further, the determining of whether the automatic activation condition is satisfied includes determining that the automatic activation condition is not satisfied, when it is determined that the driver is not careless based on the sensed driver state.

Further, the step of determining whether the automatic activation condition is satisfied includes determining that the automatic activation condition is not satisfied, when it is determined that the vehicle actively finishes a minimal risk manoeuver (MRM) operation of controlling the driving or when it is determined that a history that the driver forcibly deactivates the driving assist function is present The step of automatically activating the driving assist function includes automatically activating the driving assist function of the vehicle based on a type of a road on which the vehicle is driving, and a speed of the vehicle.

The step of automatically activating the driving assist function includes automatically activating the driving assist function of the vehicle. The driving assist function includes at least one of a SCC function of controlling a distance between vehicles, an FAC function of reducing or preventing a collision risk, an LKA function or LDW function of preventing the vehicle from deviating from a lane, an LCA function of preventing interference with an adjacent lane, an HDA function of assisting driving on a highway, or an LFA function of assisting the driving on a general road.

The method further includes automatically deactivating the driving assist function when the automatic activation condition is not satisfied after determined whether the automatic activation condition is satisfied.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Hereinafter, forms of the present disclosure will be described in detail with reference to the accompanying drawings. The following description is merely exemplary in nature and is not intended to limit the present disclosure, application, or uses. In the following description, the same reference numerals will be assigned to the same elements even though the elements are illustrated in different drawings. In addition, in the following description, a detailed description of well-known features or functions will be ruled out in order not to unnecessarily obscure the gist of the present disclosure.

In the following description of elements according to an form of the present disclosure, the terms 'first', 'second', 'A', 'B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
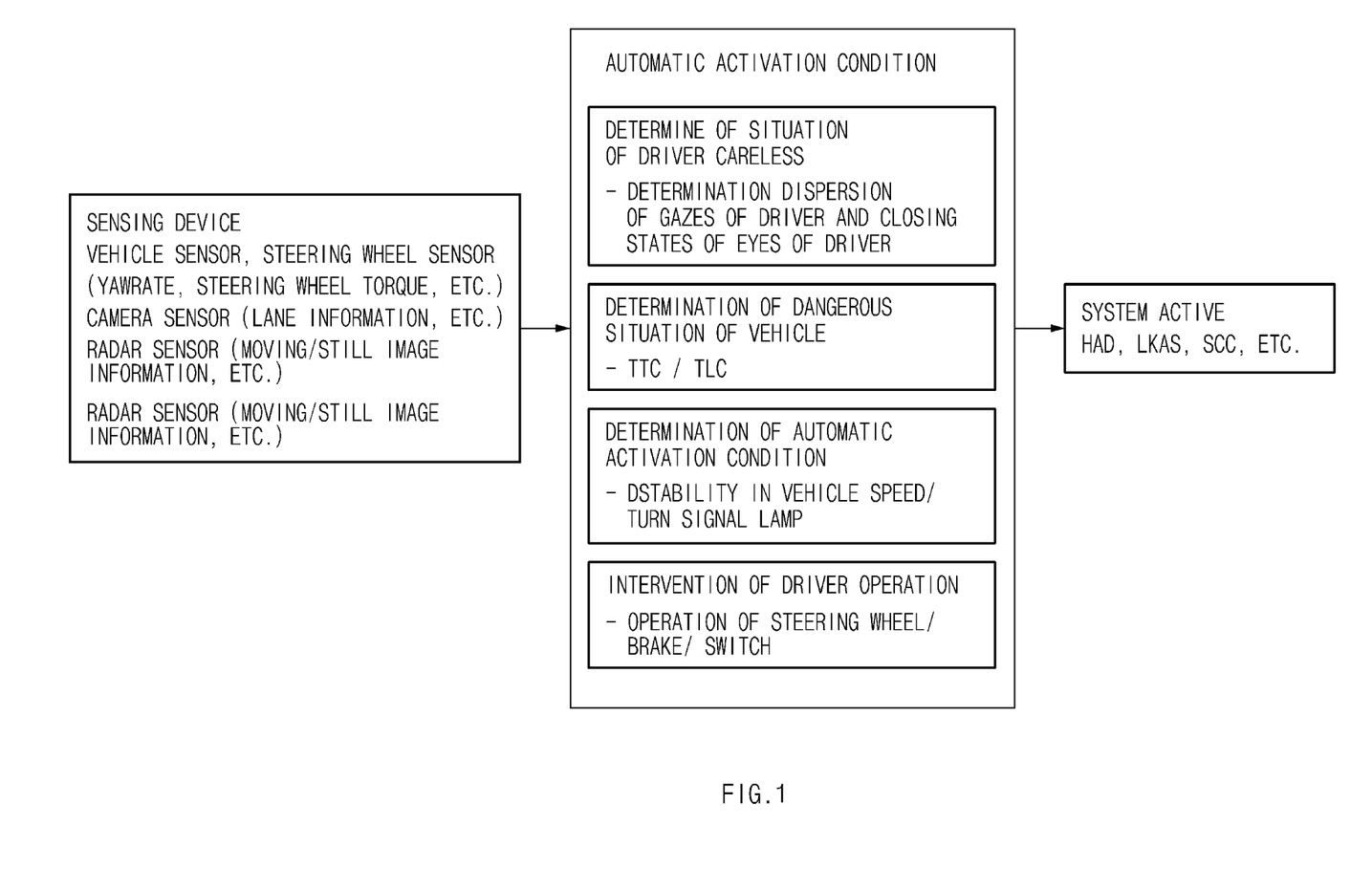
FIG. 1 is a schematic view illustrating an apparatus for automatically controlling a driving assist function of a vehicle.

FIG. 1 is a schematic view illustrating an apparatus for automatically controlling a driving assist function of the vehicle, in one form of the present disclosure.

As illustrated in FIG. 1, the apparatus for automatically controlling the driving assist function of the vehicle may acquire information such as vehicle surrounding information, driving information, and information on the driver condition sensed by the vehicle, and the apparatus may automatically activate the driving assist function of the vehicle when a condition for automatically activating the driving assist function of the vehicle is satisfied, and may automatically deactivate the driving assist function of the vehicle when the condition is not satisfied.

In more detail, the apparatus for automatically controlling the driving assist function of the vehicle may acquire a yaw rate, a steering wheel torque, lane information, information on a moving object or a stationary object around the vehicle, and the information relating to condition of a driver from various sensors.

The apparatus may determine whether an automatic control condition of the vehicle is satisfied, based on the information acquired from the sensors. For example, the apparatus may determine the careless of the driver based on whether the gazes of the driver are dispersed and the eyes of the driver are closed. In addition, the apparatus may determine the degree of risk of the vehicle based on a time to collision of a vehicle and a time to line crossing (TLC) of the vehicle. In addition, the apparatus may determine whether the driving assist function of the vehicle is automatically activated, based on the stability in a vehicle speed and a turn signal lamp. In addition, the operation of the driver may be determined based on a steering wheel operation, brake operation, or switch operation.

When it is determined that the driver is careless, or there is the collision risk of a vehicle and/or the deviation of the vehicle from a lane, the driving assist function of the vehicle may be automatically activated. Meanwhile, when it is determined that there is the operation by the driver, a control operation may be performed such that the driving assist function of the vehicle is automatically deactivated. In addition, when it is determined that the driver is not careless, the control operation may be performed such that the driving assist function of the vehicle is automatically deactivated.

The driving assist function of the vehicle, which is activated as the automatic control condition of the vehicle is determined to be satisfied, includes Smart Cruise Control (SCC) of controlling the distance between vehicles, Forward Collision Warning (FAC) of preventing the collision with another vehicle, Lane Keeping Assist (LKA) and Lane Departure Warning (LDW), Lane Change Alert (LCA) of preventing interference with an adjacent lane, Highway Driving Assist (HDA) of assisting driving on a highway, Lane Following Assist (LFA) of assisting the driving on a general road, or the like.

Figure 2:
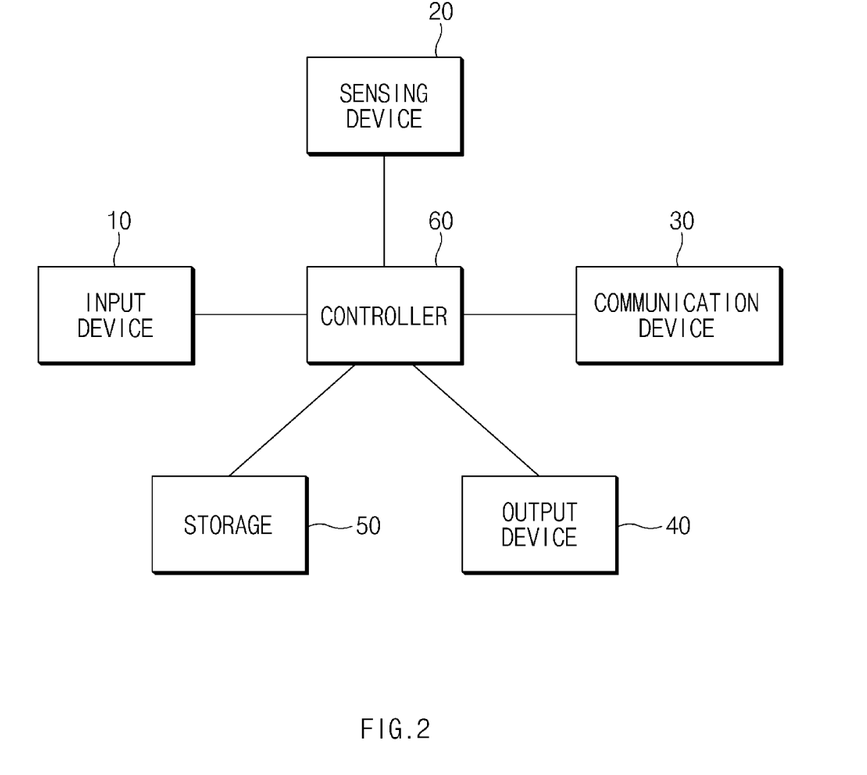
FIG. 2 is a block diagram illustrating an apparatus for automatically controlling a driving assist function of a vehicle.

FIG. 2 is a block diagram illustrating an apparatus for automatically controlling a driving assist function of a vehicle, according to one form of the present disclosure.

As illustrated in FIG. 2, the apparatus for automatically controlling the driving assist function of the vehicle may include an input device 10, a sensing device 20, a communication device 30, an output device, a storage 50, and a controller 60.

The input device 10 may receive a set-up command from the driver or may output a signal generated from the operation by the driver. To this end, the input device 10 may be implemented with at least one of a scroll wheel, a button, a knob, a touch screen, a touch pad, a lever, a track ball, and a motion sensor or the combination thereof.

The input device 10 may receive various execution commands related to mechanisms inside the vehicle and may output signals for the execution commands. For example, the input device 10 may receive a set-up command, which is related to a smart cruise control operation, from the driver and may output a signal for the set-up command. In addition, the input device 10 may output a signal generated from the operation of a brake pedal or may output a signal generated from the rotation of a steering wheel.

The sensing device 20 may include various sensors provided inside the vehicle, may acquire the surrounding information of the vehicle, the driving information of the vehicle, and the information on the driver, and may transmit the acquired information to the controller 60 through a network inside the vehicle. In more detail, the sensing device 20 may include a vehicle speed sensor, a steering angle sensor, a yaw rate sensor, an accelerator pedal sensor, a brake pedal sensor, a distance sensor, an image sensor, or an infrared sensor (IR sensor).

The vehicle speed sensor may be a sensor which senses the driving speed of the vehicle, the steering angle sensor may be a sensor which senses the rotational torque of the steering wheel, and the yaw rate sensor may be a sensor that detects the yaw rate of the vehicle about the vertical axis direction. The accelerator pedal sensor may be a sensor which senses the pressure applied to an accelerator pedal by the driver, and the brake pedal sensor may be a sensor which senses the pressure applied to a brake pedal by the driver.

The distance sensor may acquire the surrounding information of the vehicle. In more detail, the distance sensor may sense a front vehicle or a front obstacle. In more detail, the distance sensor may sense an object outside the vehicle, for example, a preceding vehicle traveling in front of the vehicle, a road, a stationary object including a structure mounted at the periphery of the road, and a vehicle approaching in an opposite lane. The distance sensor may calculate data including ground information or lane information of the road by sensing a lane marking of the road or a signal reflected from the ground surface of the road. Although the distance sensor may include a radar or a light detection and ranging (Lidar), the distance sensor may be implemented with a Lidar for accurate measurement.

The image sensor may capture an image of an outside of the vehicle. The image sensor may acquire a lane image of a road on which the vehicle is driving. The image sensor may include at least one of a front camera, which captures an image of a front side of the vehicle, left and right cameras which capture images of left and right sides of the vehicle, and a rear camera which captures an image of a rear side of the vehicle. The above cameras may include a charge-coupled device (CCD) or a complementary metal-oxide-semiconductor (CMOS) sensor.

The IR sensor may refer to a sensor which senses infrared information of an object. The IR sensor may sense the driver state by using infrared information of the driver. In more detail, the IR sensor may sense the dispersion of gazes of the driver and the closing states of the eyes of the driver.

The communication device 30 may include a communication module which supports a communication interface with vehicle controllers connected through a vehicle network. In this case, the communication module may include a module which supports controller area network (CAN) communication. The communication device 30 may transmit information, which is acquired from the sensing device 20, to the controller 60, and may transmit a computation result received from the controller 60 to the output device 40.

The output device 40 may include a human machine interface and may output a warning generated from the controller 60. The output device 40 may output the warning visually and/or acoustically depending on the driver state and/or the driving state of the vehicle. For example, the output device 40 may output a beep sound or a warning to the driver when the vehicle deviates from the lane.

The storage 50 may store various pieces of data desired for operating the apparatus for automatically controlling the driving assist function of the vehicle, according to the present disclosure. The storage 50 may be implemented with at least one of a flash memory, a hard disk, a secure digital card (SD card), a random access memory (RAM), a read only memory (ROM), a web storage, and the like.

The controller 60 may determine whether the automatic activation condition is satisfied based on the signal output from the input device 10, and the surrounding information and the driving information of the vehicle acquired from the sensing device 20, and the sensed driver state, and may automatically activate the driving assist function when the automatic activation condition is satisfied.

To this end, the controller 60 may determine the driver state based on the signal output from the input device 10 and the information acquired from the sensing device 20. For example, the controller 60 may determine the dispersion of gazes of the driver and the closing states of the eyes of the driver through the IR sensor. The controller 60 may determine the driver to be careless when the dispersion of gazes of the driver and the closing states of the eyes of the driver are sensed. In this case, the controller 60 may determine that the automatic activation condition is satisfied.

The controller 60 may determine the degree of risk of the collision with the front vehicle based on the signal output from the input device 10 and the information acquired from the sensing device 20. The degree of risk of the collision may be determined based on a time to collision (TIC) calculated by the controller 60. When the TIC is less than a first reference time, the controller 60 may determine that there is present the risk of the collision of the vehicle. For reference, the TTC refers to a value acquired by dividing a distance between a subject vehicle, which is driving, and another vehicle by the relative speed of two vehicles after measuring the distance between the two vehicles. When it is determined that there is present the risk of the collision, the controller 60 may determine the automatic activation condition to be satisfied.

The controller 60 may determine the degree of risk (lane deviation risk of a vehicle) that a vehicle deviates from a lane, based on a signal input into the input device 10 and information acquired from the sensing device 20. The degree of risk that the vehicle deviates from the lane may be determined based on a time to line crossing (TLC) calculated by the controller 60. When the TLC is less than a second reference time, the controller 60 determines that there is present the lane deviation risk of the vehicle. For reference, the TLC may refer to an estimated time that it takes for the vehicle to reach an adjacent lane when the current speed and the current direction of the vehicle are maintained. When the controller 60 determines that there is present the lane deviation risk of the vehicle, the controller 60 may determine the automatic activation condition to be satisfied.

When the controller 60 determines that the driver is careless, or determines that there is present the degree of risk of collision of the vehicle and/or the lane deviation risk of the vehicle, the controller 60 may determine the automatic activation condition to be satisfied.

In this case, the driving assist function of the vehicle may include an SCC of controlling the distance between vehicles, an FAC of reducing or preventing the risk of collision, an LKA or LDW of preventing the vehicle from deviating from a lane, an LCA of preventing interference with an adjacent lane, a Highway Driving Assist (HAD) of assisting driving on a highway, and a Lane Following Assist (LFA) of assisting the driving on a general road.

According to one form, the controller 60 may automatically activate the driving assist function of the vehicle as shown in table 1 depending on the type of a road and the vehicle speed.

TABLE 1

| Driving condition | | Activation condition | | |
|---|---|---|---|---|
| Road | Speed | TTC < first reference time | TLC < second reference time | TTC < first reference time and TLC < second reference time |
| Highway | 60 kph or less | SCC, FCA | LKA, LCA | HDA |
| | 60 kph or more | SCC | LKA, LDW, LCA | |
| IC/JC/ general road | 60 kph or less | SCC, FCA | LKA, LCA | LFA |
| | 60 kph or more | SCC | LKA, LDW, LCA | |

As shown in table 1, the controller 60 may automatically activate the SCC and the FCA when the controller 60 determines that a vehicle is driving on a highway, the speed of the vehicle is 60 kph or less, and the TIC is less than the first reference time.

In addition, the controller 60 may automatically activate the LKA, the LDW, and the LCA when the controller 60 determines that a vehicle is driving on a highway, the speed of the vehicle is 60 kph or less, and the TTC is less than the second reference time.

Further, the controller 60 may automatically activate the HDA when the controller 60 determines that a vehicle is driving on a highway, the TIC is less than the first reference time, and the TLC is less than the second reference time.

In addition, the controller 60 may automatically activate the LFA when the controller 60 determines that a vehicle is driving on a general road, the TTC is less than the first reference time, and the TLC is less than the second reference time.

Meanwhile, when the controller 60 determines that the operation by the driver is present based on the signal output from the input device 10 and the information acquired from the sensing device 20, the controller 60 determines that the automatic activation condition is not satisfied. In addition, when the automatic activation condition is not satisfied, the controller 60 may perform a control operation such that the driving assist function of the vehicle is instantly automatically deactivated.

For example, the controller 60 may determine the lighting state of a turn signal lamp, an opening degree of an accelerator, or a brake pedal pressing state based on the signal output from the input device 10 and the information acquired from the sensing device 20 and may determine the operation of the driver based on the determination result. In this case, the opening degree of the accelerator may refer to an opening amount of a throttle valve when the driver presses the accelerator pedal. When the turn signal lamp is turn on, the opening degree of the accelerator is equal to or greater than a reference value, or the signal is determined to be output due to the manipulation of the brake, the controller 60 may determine that there is present the operation of the driver.

For another example, the controller 60 may determine that there is present the operation of the driver when the steering torque of the steering wheel is equal to or greater than 'To Be Determine (TBD)'. In addition, when a command of executing a predetermined function is received (when the input device is manipulated), the controller 60 determines that there is present the operation of the driver.

When the controller 60 determines that the driver is careless, the controller 60 maintains the activated function for a specific time. When the controller 60 that there is present a history of forcibly deactivating the driving assist function of the vehicle, the controller 60 determines that the automatic activation condition is not satisfied. In addition, when the automatic activation condition is not satisfied, the controller 60 may perform a control operation to instantly automatically deactivate the driving assist function of the vehicle.

The controller 60 may perform a control operation to output a warning to a driver for a specific time to maintain the activated function after determining that the driver is careless. In this case, the outputting of the warning to the driver may be understood as an operation of transferring driving control to the driver.

The controller 60 may perform a control operation to output the warning by increasing the strength of the warning depending on the driver state. For example, the controller 60 may perform a control operation to primarily output a visual warning. When the controller 60 determines that the driver recognizes the primary warning, the controller 60 may determine that the driver is not careless.

However, when the controller 60 determines that the driver does not recognize the primary warning, the controller 60 may perform a control operation to secondarily output the visible warning together with an acoustic warning. When the driver recognizes the secondary warning, the controller 60 may determine that the driver is not careless.

However, when the controller 60 determines that the driver does not recognize the secondary warning, the controller 60 may perform a control operation to output a visible warning and a warning through a brake as a tertiary warning. When the driver recognizes the tertiary warning, the controller 60 may determine that the driver is not careless.

The primary to tertiary warnings may be called Transition Demand (TD) and the controller 60 may perform a minimal risk manoeuver (MRM) after the TD occurs. In this case, the MRM operation refers to an operation of actively controlling the driving of the vehicle when the driver is determined to be still careless even though the TD has occurred.

According to the form, the MRM operation may include an emergency stop on the shoulder, stop after deceleration, cruising, and an e-call. In this case, the e-call may refer to a service of establishing a voice channel between a driver, who has caused a car accident, and an operator of an accident reception center, after transmitting data related to accident information to the accident reception center when the accident is caused.

The controller 60 may determine that the automatic activation condition is not satisfied when it is determined that there is a history that the driving assist function of the vehicle has been forcibly deactivated after the MRM operation has been finished.

When there is absent the history that the driving assist function of the vehicle has been forcibly deactivated after the MRM operation has been finished or when it is determined that the MRM operation has not been finished, the controller 60 may determine that the automatic activation condition is satisfied and thus may maintain the driving assist function in the activation state.

Figure 3:
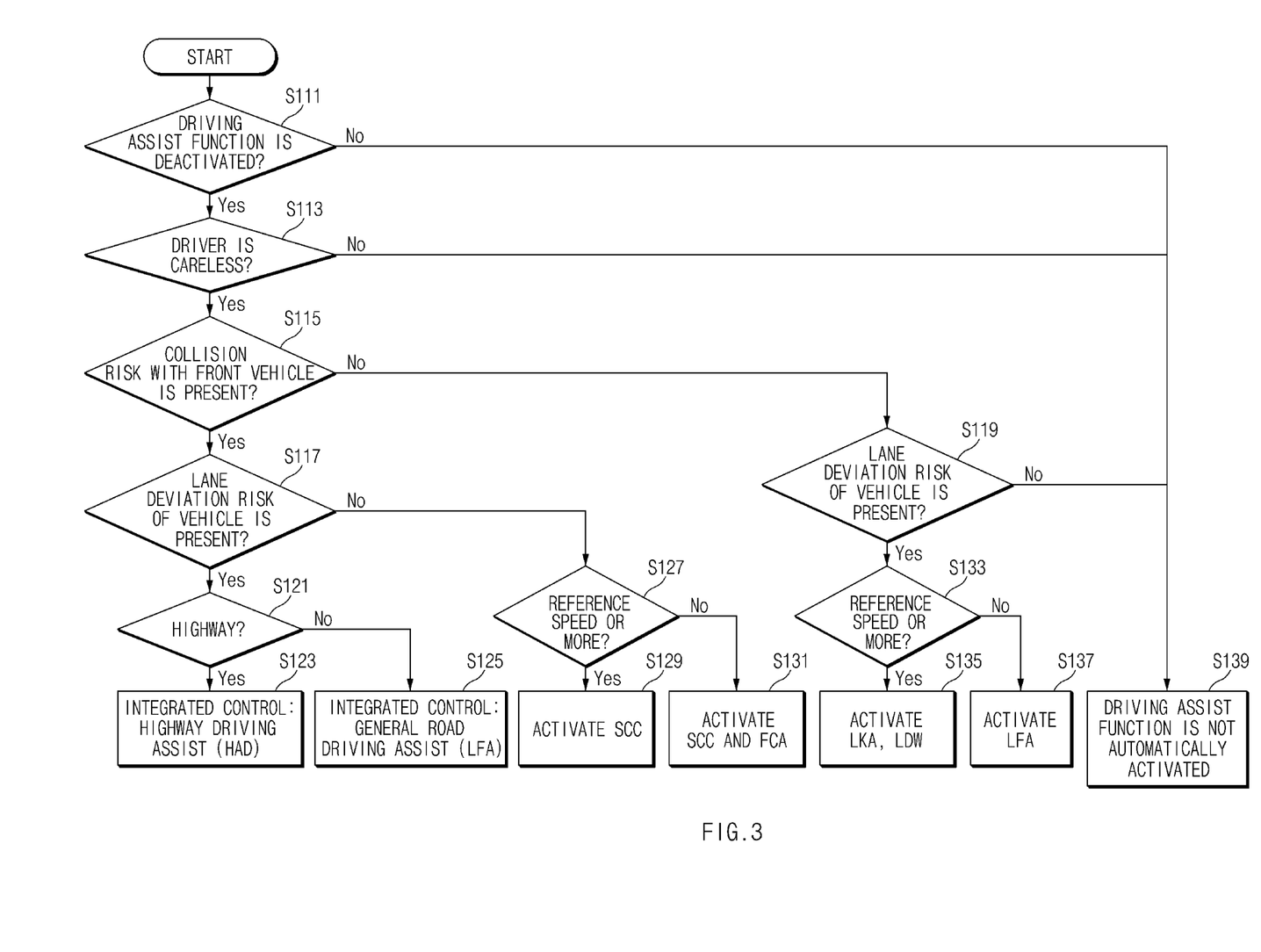
FIG. 3 is a flowchart illustrating a method for automatically controlling a driving assist function of a vehicle.

FIG. 3 is a flowchart illustrating a method for automatically controlling a driving assist function of a vehicle, capable of automatically activating the driving assist function of the vehicle, according to one form of the present disclosure.

As illustrated in FIG. 3, it is determined whether the driving assist function is deactivated in a vehicle which is driving (S111). When it is determined that the driving assist function has been activated in the vehicle, since the driving assist function has been already activated, the driving assist function is not automatically activated (S139).

When it is determined that the driving assist function is not activated in the vehicle in operation S111. The dispersion of gazes of the driver and the closing states of the eyes of the driver are determined through the IR sensor in operation S113. When it is determined that the gazes of the driver are dispersed and the eyes of the driver are closed in S113, it is determined that the driver is careless.

When it is determined that the driver is not careless in operation S113, the driving assist function is not automatically activated (S139). When it is determined that the driver is careless in operation S113, it is determined that there is present the collision risk with the front vehicle (S115).

In operation S115, the TTC may be calculated and the collision risk may be determined as the calculated result. When the TTC is less than the first reference time, it may be determined that there is present the collision risk of the vehicle. For reference, the TTC refers to a value acquired by dividing a distance between a subject vehicle, which is driving, and another vehicle by the relative speed of two vehicles after measuring the distance between the two vehicles.

When it is determined that there is present the collision risk with the front vehicle, based on the TTC in operation S115, it is determined whether there is present lane deviation risk of the vehicle (S117). In addition, even if it is determined that there is absent the collision risk with the front vehicle in operation S115, it is determined whether there is present the lane deviation risk of the vehicle (S119).

In operation S117 and S119, the TLC is calculated and the lane deviation risk of the vehicle is determined based on the calculated TLC. When the TLC is less than the second reference time, it is determined that there is present the lane deviation risk of the vehicle. For reference, the TLC may refer to an estimated time that it takes for the vehicle to reach an adjacent lane when the current speed and the current direction of the vehicle are maintained.

When there is present the lane deviation risk of the vehicle in operation S117, it is determined whether the current road on which the vehicle is driving is a highway (S121). When it is determined that the current road on which the vehicle is driving is a highway, the driving assist function is automatically activated and a high driving assist (HAD) function is automatically activated (S123). Meanwhile, when it is determined that the current road on which the vehicle which is driving is not a highway, the driving assist function is automatically activated and a lane following assist (LFA) function is automatically activated (S125).

When the lane deviation risk of vehicle is absent in S117, it is determined whether the vehicle speed is a reference speed or more (S127). In operation S127, the reference speed may be 60 kph.

It is determined that the vehicle speed is equal to or greater than the reference speed in operation S127, the driving assist function is automatically activated and the SCC function is automatically activated (S129). When the vehicle speed is less than the reference speed in operation S127, the driving assist function is automatically activated and the SCC function and the FCA function are automatically activated (S131).

Meanwhile, when it is determined that there is absent the collision risk with the front vehicle in operation S115, it is determined whether there is present the lane deviation risk of vehicle (S119). When it is determined that there is present the lane deviation risk of vehicle in operation S119, it is determined whether the vehicle speed is the reference speed or more (S133). In operation S133, the reference speed may be 60 kph. When it is determined that there is present the lane deviation risk of vehicle in operation S119, the driving assist function is not automatically activated (S139).

It is determined that the vehicle speed is the reference speed or more in operation S133, the driving assist function is automatically activated and the LKA and LDW function are automatically activated (S135). When it is determined that the vehicle speed is less than the reference speed in operation S133, the driving assist function is automatically activated and the LFA function is automatically activated (S137).

Figure 4:
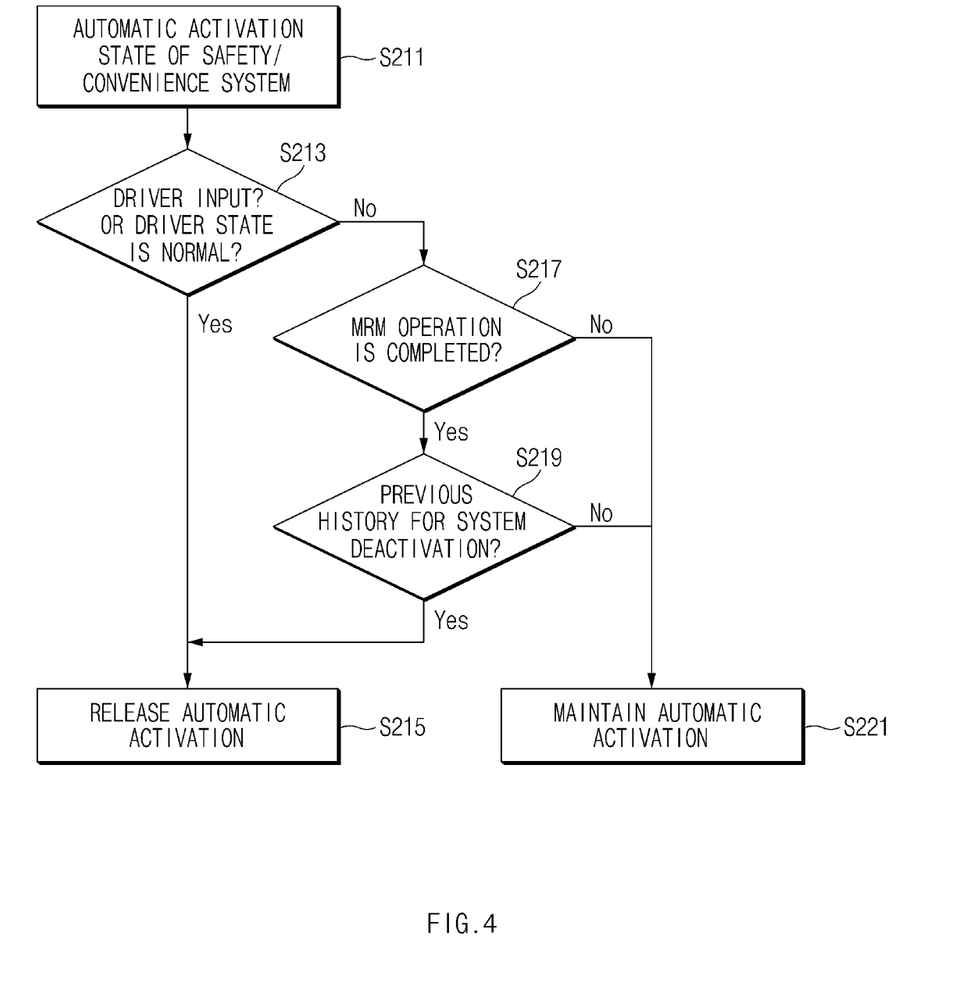
FIG. 4 is a flowchart illustrating a method for automatically controlling a driving assist function of a vehicle.

FIG. 4 is a flowchart illustrating a method for automatically controlling a driving assist function of a vehicle, capable of automatically deactivating the driving assist function of the vehicle, according to another form of the present disclosure.

As illustrated in FIG. 4, the driving assist function is activated in the vehicle which is driving (S211). In operation 211, the activated driving assist function may include an SCC function of controlling a distance between vehicles, an FAC function of reducing or preventing a collision risk, an LKA function or LDW function of preventing the vehicle from deviating from a lane, an LCA function of preventing interference with an adjacent lane, an HDA function of assisting driving on a highway, and an LFA function of assisting the driving on a general road.

It is determined whether the operation of the driver is present or the driver state is normal in the state that the driving assist function is activated (S213). In operation S213, the operation of the driver may be determined based on the lighting state of a turn signal lamp, an opening degree of an accelerator, or a brake pedal pressing state based on the signal output from the input device and the information acquired from the sensing device. It may be determined that there is present the operation of the driver in operation S213 when the turn signal lamp is turned on, the opening degree of the accelerator is a reference value or more, or a signal is input due to the manipulation of the brake.

The dispersion of gazes of the driver and the closing states of the eyes of the driver are determined based on the signal output from the input device and the information acquired by the sensing device in operation S213. When it is determined that the gazes of the driver are not dispersed or the eyes of the driver are closed, it may be determined that the driver is normal in operation S213.

When it is determined that the operation of the driver is resent or the driver is normal in operation S213, the activated driving assist function is automatically deactivated (S215). When it is determined that the operation of the driver is absent or the driver is abnormal in operation S213, it is determined that the MRM operation has been finished (S217).

In this case, the MRM operation refers to an operation of actively controlling the driving of the vehicle when the driver is determined as being still careless. For example, the MRM operation may include an emergency stop on the shoulder, stop after deceleration, cruising, and an e-call. In this case, the e-call may refer to a service of establishing a voice channel between a driver, who has caused a car accident, and an operator of an accident reception center, after transmitting data related to accident information to the accident reception center when the accident is caused.

When it is determined that the MRM operation has not been finished in operation S217, the driving assist function is maintained in the activated state (S221).

When it is determined that the MRM operation has been finished in operation S217, it is determined whether there is present a history that the driver forcibly deactivates the driving assist function of the vehicle (S219). When it is determined that there is present a history that the driver forcibly deactivates the driving assist function of the vehicle in operation S219, the driving assist function is automatically deactivated (S215). Meanwhile, when it is determined that there is absent the history that the driver forcibly deactivates the driving assist function of the vehicle in operation S219, the driving assist function is maintained in the activated state (S221).

Therefore, according to the present disclosure, when it is determined that the driver's operation is present or it is determined that the driver's state is normal, the activated driving assist function may be instantly deactivated. In addition, when the MRM operation has been finished and when there is present the history that the driving assist function of the vehicle is deactivated, the deactivated driving assist function may be automatically deactivated.

Figure 5:
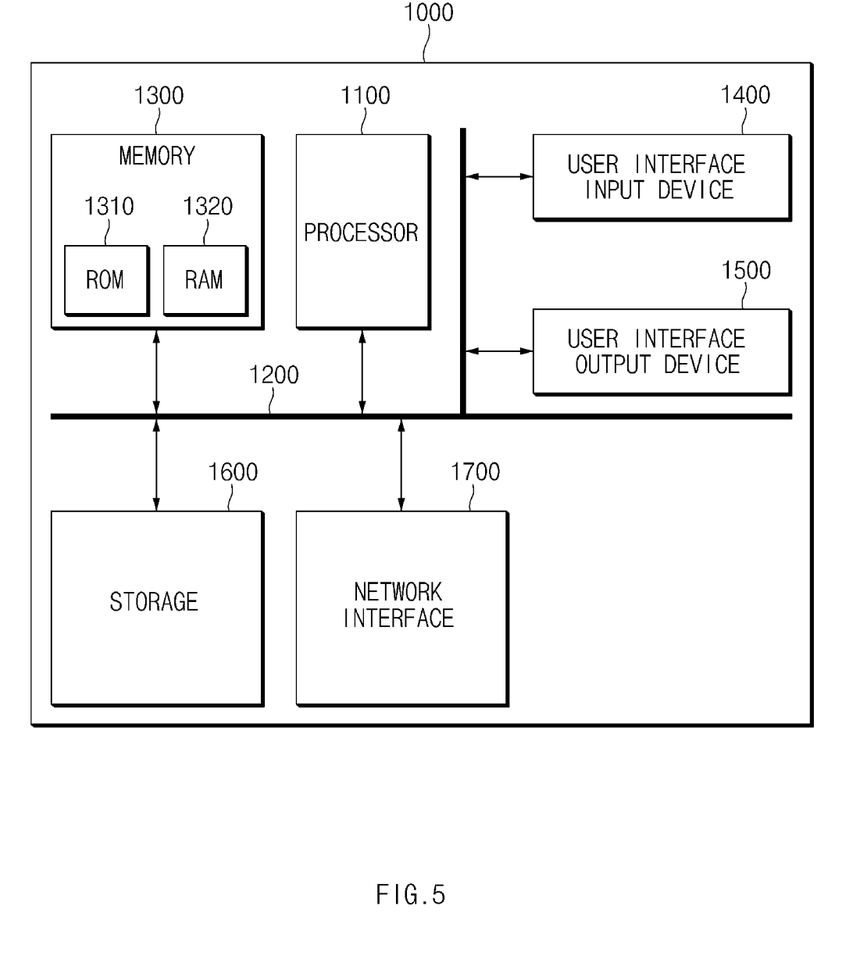
FIG. 5 is a view illustrating the configuration of a computing system executing the method.

FIG. 5 is a block diagram illustrating a computing system to execute the method according to one form of the present disclosure.

Referring to FIG. 5, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to the present disclosure, in the apparatus and the method for automatically controlling the driving assist function of the vehicle, the driving assist function is activated depending on the state of the driver and the type of the road on which the vehicle is driving and thus the safety driving function and the convenience function are improved. Accordingly, the safety of the driver and the vehicle may be secured. In addition, the driving assist function may be automatically deactivated depending on the state of the driver and the road on which the vehicle is driving and thus the optimal control is possible for the safety.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, forms of the present disclosure are not intended to limit the technical spirit of the present disclosure, but provided only for the illustrative purpose.

What is claimed is:

1. An apparatus for automatically controlling a driving assist function of a vehicle, the apparatus comprising:
   a sensing device configured to sense surrounding information and driving information of the vehicle and a state of a driver;
   a controller configured to:
      determine whether an automatic activation condition for automatically activating the driving assist function is satisfied, based on the sensed surrounding information and driving information of the vehicle, and the sensed driver state;
      automatically activate the driving assist function when the automatic activation condition is satisfied, wherein the driving assist function includes a plurality of modes;
      choose and activate at least one mode among the plurality of modes of the driving assist function based on a type of a road on which the vehicle is driving, and a speed of the vehicle; and
      when an operation by the driver is present, determine that the automatic activation condition is not satisfied, and deactivate the driving assist function.

2. The apparatus of claim 1, wherein when the controller determines that the driver is careless, the controller is configured to determine that the automatic activation condition is satisfied.

3. The apparatus of claim 1, wherein the controller is configured to determine that the automatic activation condition is satisfied when a collision risk with a front vehicle is present.

4. The apparatus of claim 1, wherein the controller is configured to determine that the automatic activation condition is satisfied when a lane deviation risk of the vehicle is present.

5. The apparatus of claim 1, wherein the controller is configured to choose the at least one mode among the plurality of modes the driving assist function based on the type of the road on which the vehicle is driving, the speed of the vehicle, a time to line crossing (TLC) on the road, and a time to collision (TTC) with another vehicle.

6. The apparatus of claim 1, wherein the controller is configured to determine that the automatic activation condition is not satisfied when the driver is not careless.

7. The apparatus of claim 1, wherein the controller is configured to determine that the automatic activation condition is not satisfied when the vehicle actively finishes a minimal risk manoeuver (MRM) operation of controlling the driving or when a history that the driver forcibly deactivates the driving assist function is present.

8. The apparatus of claim 1, wherein the controller is configured to automatically deactivate an activated driving assist function when the vehicle fails to satisfy the automatic activation condition.

9. The apparatus of claim 1, wherein the plurality of modes of the driving assist function of the vehicle includes:
   a smart cruise control (SCC) configured to control a distance between vehicles, a forward collision warning (FAC) function configured to prevent a collision risk, a lane keeping assist (LKA) function and a lane departure warning (LDW) function each configured to inhibit the vehicle from deviating from a lane, a lane change alert (LCA) function configured to inhibit interference with an adjacent lane, a highway driving assist (HDA) function configured to assist driving on a highway, and a lane following assist (LFA) function configured to assist the driving on a general road.

10. A method for automatically controlling a driving assist function of a vehicle, the method comprising the steps of:
   sensing, by a sensing device, surrounding information and driving information of the vehicle and a state of a driver;
   determining, by a controller, whether an automatic activation condition for automatically activating the driving assist function is satisfied based on the sensed surrounding information and driving information of the vehicle, and the sensed state of the driver; and
   choosing and automatically activating, by the controller, at least one mode among a plurality of modes of the driving assist function based on a type of a road on which the vehicle is driving, and a speed of the vehicle when the automatic activation condition is satisfied,
   wherein the step of determining whether the automatic activation condition is satisfied includes:
      when an operation by the driver is present, determining that the automatic activation condition is not satisfied, and automatically deactivating the driving assist function.

11. The method of claim 10, wherein the step of determining whether the automatic activation condition is satisfied includes:
   determining that the automatic activation condition is satisfied when the driver is careless based on the sensed state of the driver.

12. The method of claim 10, wherein the step of determining whether the automatic activation condition is satisfied includes:
   determining that the automatic activation condition is satisfied when a collision risk between the vehicle and a front vehicle is present based on the sensed surrounding information and driving information of the vehicle.

13. The method of claim 10, wherein the step of determining whether the automatic activation condition is satisfied includes:
   determining that the automatic activation condition is satisfied when a lane deviation risk of the vehicle is present based on the sensed surrounding information and driving information of the vehicle.

14. The method of claim 10, wherein the step of determining whether the automatic activation condition is satisfied includes:
   determining that the automatic activation condition is not satisfied when the driver is not careless based on the sensed driver state.

15. The method of claim 10, wherein the step of determining whether the automatic activation condition is satisfied includes:
   determining that the automatic activation condition is not satisfied when the vehicle actively finishes a minimal risk manoeuver (MRM) operation of controlling the driving or when a history that the driver forcibly deactivates the driving assist function is present.

16. The method of claim 10, wherein the step of automatically activating the at least one mode among the plurality of modes of the driving assist function includes:

automatically activating the driving assist function of the vehicle based on the type of the road on which the vehicle is driving, the speed of the vehicle, a time to line crossing (TLC) on the road, and a time to collision (TTC) with another vehicle.

17. The method of claim 10, wherein the plurality of modes of the driving assist function includes:

a SCC function for controlling a distance between vehicles, a FAC function for preventing a collision risk, a LKA function or LDW function for preventing the vehicle from deviating from a lane, a LCA function for preventing interference with an adjacent lane, a HDA function for assisting driving on a highway, and a LFA function of assisting the driving on a general road.

18. The method of claim 10, further comprising:

automatically deactivating the driving assist function when the automatic activation condition is not satisfied after determined whether the automatic activation condition is satisfied.

\* \* \* \* \*